United States Patent
Yen

(10) Patent No.: US 8,658,049 B2
(45) Date of Patent: Feb. 25, 2014

(54) METHOD FOR MANUFACTURING A TOUCH PANEL

(75) Inventor: Tsung-Hsien Yen, Tainan (TW)

(73) Assignee: HannStar Display Corporation, New Taipei (TW)

( * ) Notice: Subject to any disclaimer, the term of this patent is extended or adjusted under 35 U.S.C. 154(b) by 0 days.

(21) Appl. No.: 13/619,041

(22) Filed: Sep. 14, 2012

(65) Prior Publication Data

US 2013/0206721 A1    Aug. 15, 2013

(30) Foreign Application Priority Data

Feb. 10, 2012  (CN) .......................... 2012 1 0030648

(51) Int. Cl.
*C03C 15/00*    (2006.01)

(52) U.S. Cl.
USPC ................... 216/43; 216/83; 216/96; 216/97; 216/100

(58) Field of Classification Search
None
See application file for complete search history.

(56) References Cited

U.S. PATENT DOCUMENTS

| 8,388,852 | B2 * | 3/2013 | Huang et al. | 216/43 |
| 2010/0066683 | A1 * | 3/2010 | Chang et al. | 345/173 |
| 2012/0094090 | A1 * | 4/2012 | Yamazaki et al. | 428/195.1 |
| 2013/0153128 | A1 * | 6/2013 | Krogdahl et al. | 156/196 |
| 2013/0168138 | A1 * | 7/2013 | Yamazaki et al. | 174/253 |

FOREIGN PATENT DOCUMENTS

TW    M381836    6/2010

* cited by examiner

*Primary Examiner* — Duy Deo
(74) *Attorney, Agent, or Firm* — Muncy, Geissler, Olds & Lowe, P.C.

(57) ABSTRACT

A method for manufacturing a touch panel includes the following steps. A mother plate is provided. A plurality of adhesive materials are formed on the mother plate. A plurality of cover glasses are disposed on the adhesive materials respectively. The adhesive materials are cured, whereby the cover glasses are attached to the mother plate. A plurality of circuit units are formed on the cover glasses respectively. The cover glass having the circuit unit is removed from the mother plate, wherein the bonding strength of the cured adhesive material is within a range about between 5 g/25 mm and 600 g/25 mm, whereby the adhesive material provides enough adhesive force between the cover glass and the mother plate, and the adhesive material cannot be stayed on a surface of the cover glass during a removing process.

10 Claims, 7 Drawing Sheets

METHOD FOR MANUFACTURING A TOUCH PANEL

CROSS-REFERENCE TO RELATED APPLICATION

This application claims the benefit of China Patent Application No. 201210030648.4, filed on Feb. 10, 2012, which is hereby incorporated by reference for all purposes as if fully set forth herein.

BACKGROUND OF THE INVENTION

1. Field of Invention

This invention relates to a method for manufacturing a touch panel, and more particularly to a method for manufacturing a touch panel, the method can carry out a plurality of sensor processes simultaneously.

2. Related Art

According to different principle, four types of typical touch panel are resistance type, capacitance type, sound wave type and optics type. In the past, a hand-held electronic device having small size panel includes a touch panel which is resistance type touch panel generally. However, after Apple inc. develops "iPhone" cellular phone, the capacitance type touch panel is return to be the focus of attention. According different design of a touch area, the capacitance type touch panel includes a surface capacitance type touch panel (single touch point) and a projective capacitance type touch panel (multiple touch points). The "iPhone" cellular phone uses the projective capacitance type touch panel having a function of multiple touch points, the function can detect and recognize multiple touch actions, such as narrowing/enlarging, rotating, dragging actions, etc. so as to increase the convenient during use. The projective capacitance type touch panel not only has the function of multiple touch points, but also prevents a touch screen from a wear caused by the press and pressure of fingers as compared with the conventional resistance type touch panel.

Recently, the projective capacitance type touch panel mainly includes two groups of cover glass/glass substrate and cover glass/film. Referring to FIGS. 1 and 2, Taiwan Patent No. M381836 discloses a method for manufacturing a conventional projective capacitance type touch panel. Firstly, a glass substrate 61 is provided. A silica ($SiO_2$) is sputtered onto a surface of the glass substrate 61 so as to form a silica layer 62. An indium tin oxide (ITO) is formed on the silica layer 62 so as to form a transparent trace area 63, and a metallic layer is formed on the silica layer 62 so as to form a conductive trace layer 64. Then, an optical clear adhesive (OCA) 65 is coated on the transparent trace area 63, the conductive trace layer 64 and a region of the silica layer 62 which is not covered by the transparent trace area 63 and the conductive trace layer 64. A cover glass (tempered glass) 66 is provided, and covers the optical clear adhesive 65 by a adhesive manner, thereby bonding the tempered glass 66 to the silica layer 62 of the glass substrate 61 so as to form the projective capacitance type touch panel. The tempered glass 66 is adapted to protect the transparent trace area 63 and the conductive trace layer 64 so as to prevent the transparent trace area 63 and the conductive trace layer 64 from the environmental affect.

In order to effectively decrease the thickness, weight and material cost, the transparent trace area of the ITO layer and the conductive trace layer of the metallic layer are integrated onto the surface of the cover glass in a new process. If the strength of the cover glass is considered, a small piece of tempered glass must be used to be acted as the cover glass so as to carry out the process of the ITO layer. The prior art discloses that a small piece of tempered glass is used to carry out one sensor process on a single glass, the prior art doesn't discloses that a plurality of tempered glass are used to carry out a plurality of sensor processes on multiple glasses simultaneously. For example, the sensor process can form the ITO material, pattern the ITO layer, and form the transparent trace area by a sputtering process, a photo-resist coating process, an exposing process, a developing process, an etching process, etc.

However, one sensor process of the touch panel on a single glass will need much manpower so as to decrease the efficiency, and it is easy to touch the touch panel by worker so as affect the yield rate.

Accordingly, there exists a need for a method for manufacturing a touch panel capable of solving the above-mentioned problems.

SUMMARY OF THE INVENTION

The present invention provides a method for manufacturing a touch panel includes the following steps. A mother plate is provided. A plurality of adhesive materials are formed on the mother plate. A plurality of cover glasses are disposed on the adhesive materials respectively. The adhesive materials are cured, whereby the cover glasses are attached to the mother plate. A plurality of circuit units are formed on the cover glasses respectively. The cover glass having the circuit unit is removed from the mother plate, wherein the bonding strength of the cured adhesive material is within a range about between 5 g/25 mm and 600 g/25 mm, whereby the adhesive material provides enough adhesive force between the cover glass and the mother plate, and the adhesive material cannot be stayed on a surface of the cover glass during a removing process.

A method for manufacturing a touch pane of the present invention carry out a plurality of sensor processes on multiple cover glasses simultaneously (the cover glass is a small piece of glass) so as to increase the efficiency. In addition, the bonding strength of the cured adhesive material is within a range between 5 g/25 mm and 600 g/25 mm, the bonding area between the adhesive material and the mother plate is equal to that between the adhesive material and the cover glass, and the bonding area between the adhesive material and the cover glass is smaller than the area of the bottom of the cover glass; and thus there is enough space to remove the cover glass by using the scraper. Furthermore, there is the space and position used for the scraper which can be adapted to remove the cover glass, and thus the adhesive material cannot be stayed on a surface of the cover glass during the removing process.

In order to make the aforementioned and other objectives, features and advantages of the present invention comprehensible, embodiments are described in detail below with reference to the accompanying drawings.

The present invention will become more fully understood from the detailed description given herein below for illustration only, and thus are not limitative of the present invention, and wherein:

DETAILED DESCRIPTION OF THE INVENTION

Figure 1:
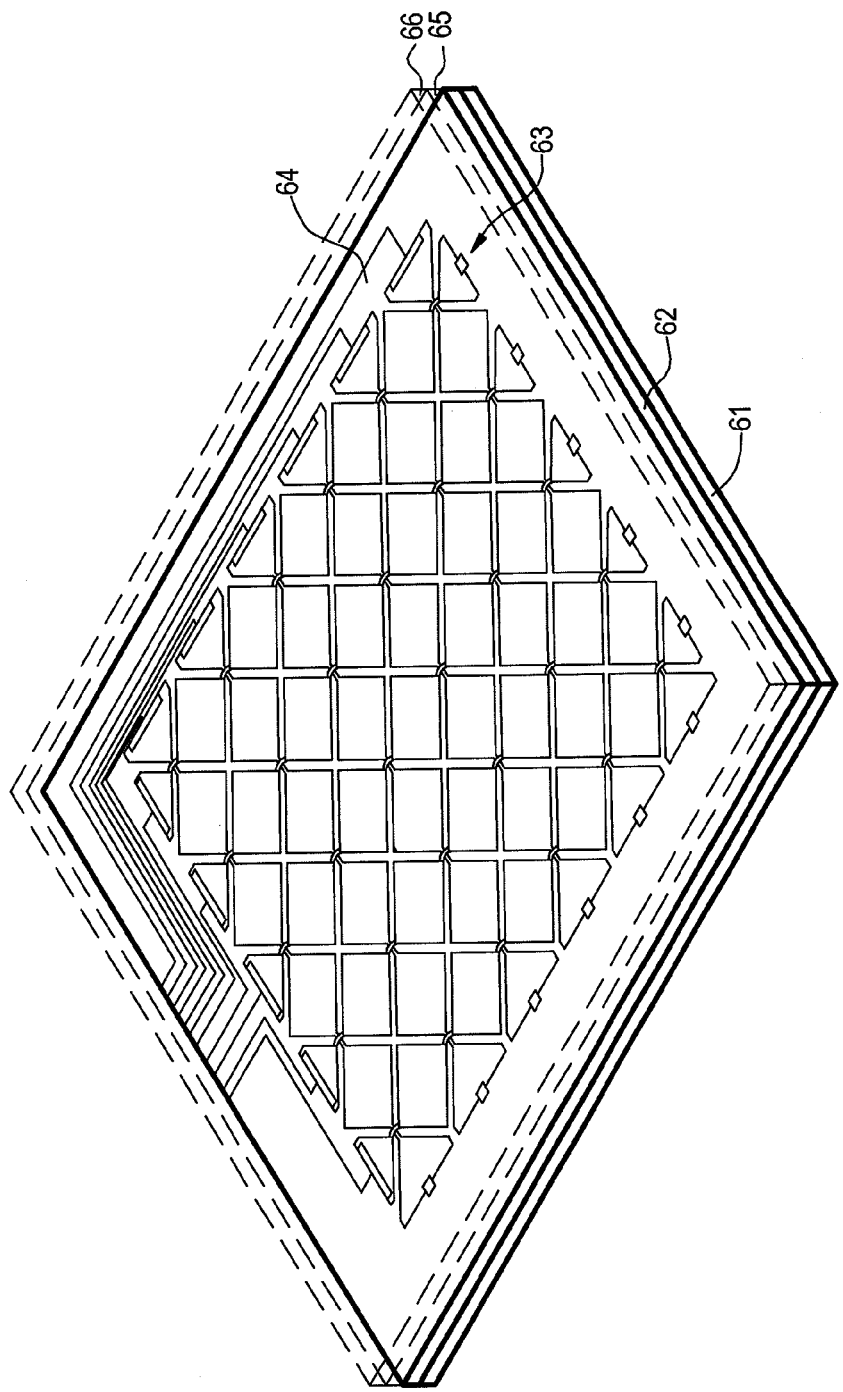
FIG. 1 is a perspective schematic view of a conventional projective capacitance type touch panel.
Figure 2:
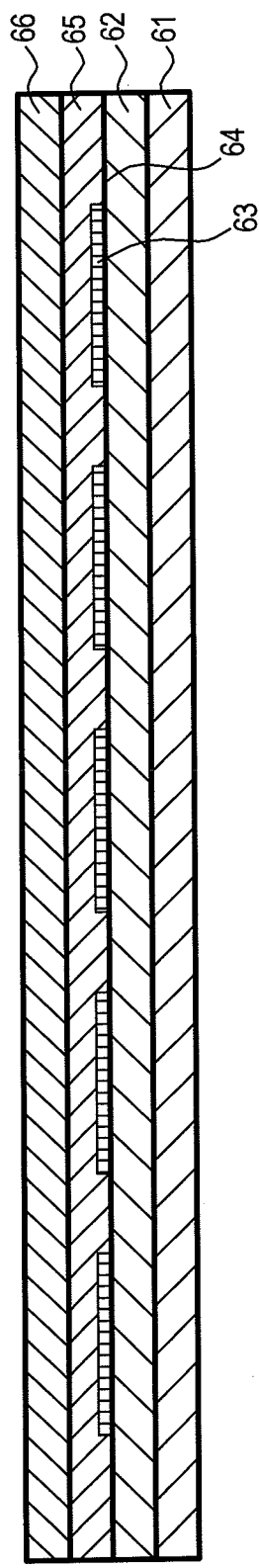
FIG. 2 is a cross-sectional schematic view of a conventional projective capacitance type touch panel.
Figure 3:
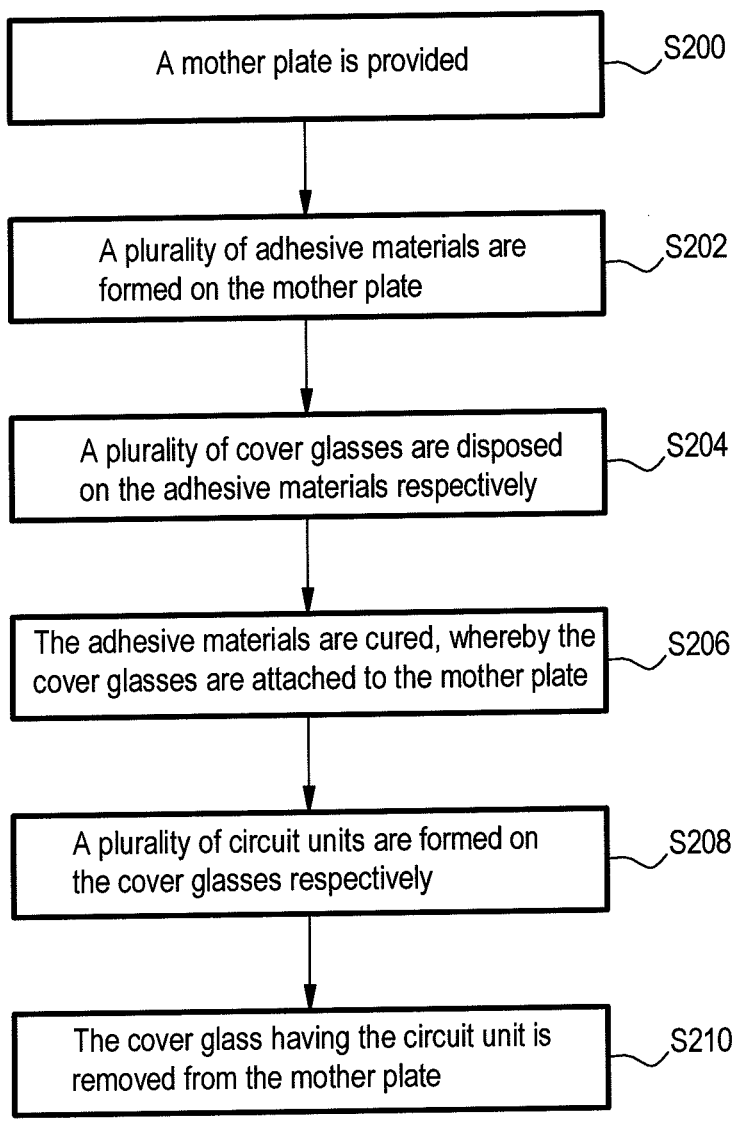
FIG. 3 is a flow chart showing a method for manufacturing a touch panel according to an embodiment of the present invention.
Figure 4:
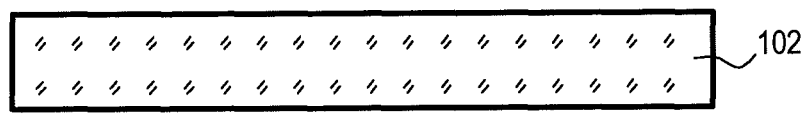
FIGS. 4 to 10 are perspective and cross-sectional schematic views showing a method for manufacturing a touch panel according to an embodiment of the present invention.
Figure 5:
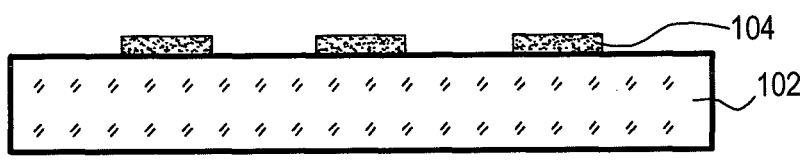
Figure 6:
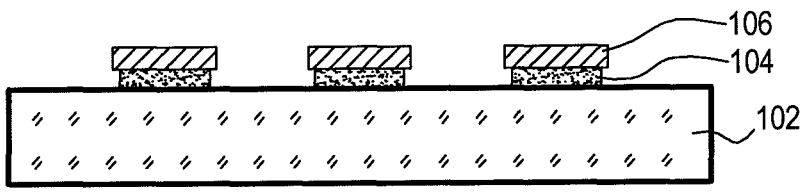
Figure 7:
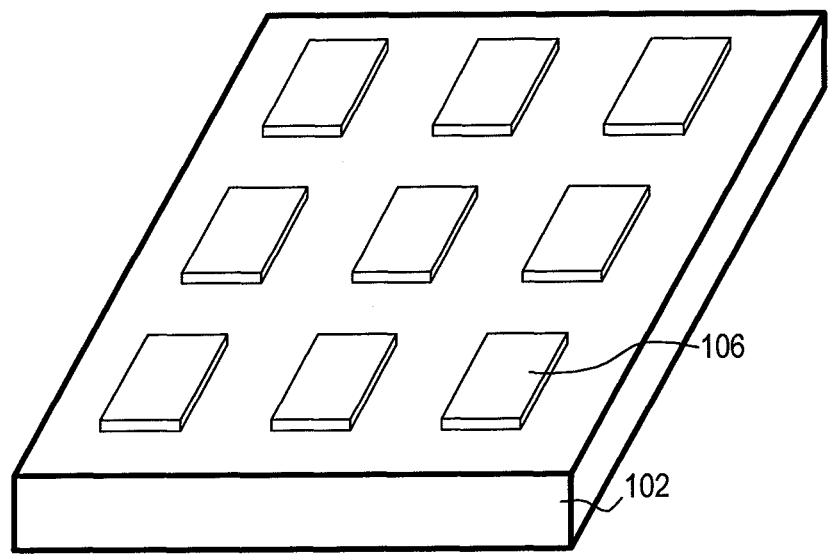

Referring to FIG. 3, it depicts a method for manufacturing a touch panel according to an embodiment of the present invention. Detailed steps are shown in FIGS. 4 to 10. Referring to FIG. 4, in step S200, a mother plate 102 (e.g., glass plate) is provided. Referring to FIG. 5, in step S202, a plurality of adhesive materials 104 are formed on the mother plate 102. For example, the adhesive materials 104 can be formed on the mother plate 102 by a printing process, an adhesive dispensing process or a spraying process. Referring to FIG. 6, in step S204, a plurality of cover glasses 106 are disposed on the adhesive materials respectively. In order to let the cover glass 106 provide enough strength, a tempered glass can be used to be acted as the cover glass 106. Referring to FIG. 7, the cover glass 106 and the adhesive materials 104 are arranged on the mother plate 102 in an array arrangement manner, but it is not limited thereto.

In step S206, the adhesive materials 104 are cured, whereby the cover glasses 106 are attached to the mother plate 102. For example, the adhesive materials 104 can be ultraviolet rays adhesive made of ink material, and are curd by emitting ultraviolet rays. The principle of the adhesive materials 104 cured by emitting ultraviolet rays is as follows. A photo initiator is added to a resin. After the resin having the photo initiator absorb high intensity ultraviolet rays of an ultraviolet rays curing device, active free radicals or ion radicals are generated so as to result in polymerization, cross-linking and subsequent reactions, whereby the resin (ultraviolet rays coating, ultraviolet rays ink or ultraviolet rays adhesive, etc.) is changed from liquid phase to solid phase within seconds or minutes. After curing, the bonding strength of the cured adhesive material 104 must be within a range between 5 g/25 mm and 600 g/25 mm, whereby the adhesive material 104 provides enough adhesive force between the cover glass 106 and the mother plate 102 so as to carry out a forming step of circuit units subsequently.

Figure 8:
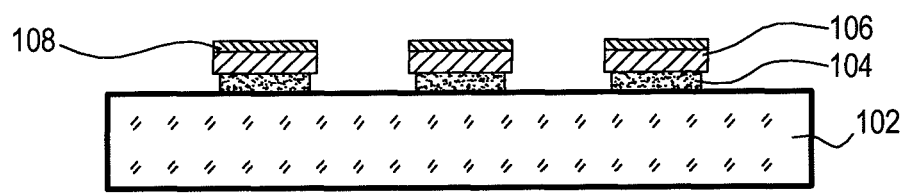

Referring to FIG. 8, in step S208, a plurality of circuit units 108 are formed on the cover glasses 106 respectively. The circuit units 108 can include a transparent trace area, a conductive trace layer or a flexible circuit board, etc. The transparent trace area can be made of a material of indium tin oxide (ITO), and is formed by a sensor process. The sensor process includes a sputtering process and a photolithography/etching process. The sputtering process is operated within the temperature range about between 25 and 190 degrees Celsius, and thus the cured adhesive material 104 must be durable within the temperature range about between 15 and 200 degrees Celsius so as to prevent the adhesive force of the adhesive material 104 from damage during the sputtering process. The photolithography/etching process is operated within the acidity/alkalinity range being about PH: 0-3 and PH: 11-14, and thus the cured adhesive material 104 must be durable within the acidity/alkalinity range being about PH: 0-3 and PH: 11-14 so as to prevent the adhesive force of the adhesive material 104 from damage during the photolithography/etching process.

Figure 9:
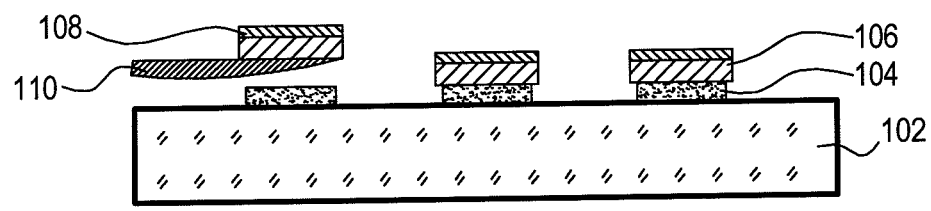

Referring to FIG. 9, in step S210, the cover glass 106 having the circuit unit 108 is removed from the mother plate 102. In this embodiment, the cover glass 106 having the circuit unit 108 is removed from the mother plate 102 by a scraping process. More detailed, a scraper 110 is inserted between the mother plate 102 and the cover glass 106, and then is adapted to remove the cover glass 106 from the mother plate 102 so as to separate the cover glass 106 from the mother plate 102. Particularly, the scraper 110 is inserted between a bottom of the mother plate 102 and a top of the cover glass 106, and then is adapted to separate the cover glass 106 from the mother plate 102. The bonding strength of the cured adhesive material 104 is within a range between 5 g/25 mm and 600 g/25 mm, the bonding area between the adhesive material 104 and the mother plate 102 is equal to that between the adhesive material 104 and the cover glass 106, and the bonding area between the adhesive material 104 and the cover glass 106 is smaller than the area of the bottom of the cover glass 106; and thus there is enough space to remove the cover glass 106 by using the scraper 110. Furthermore, there is the space and position used for the scraper 110 which can be adapted to remove the cover glass 106, and thus the adhesive material 104 cannot be stayed on a surface of the cover glass 106 during the removing process.

Figure 10:
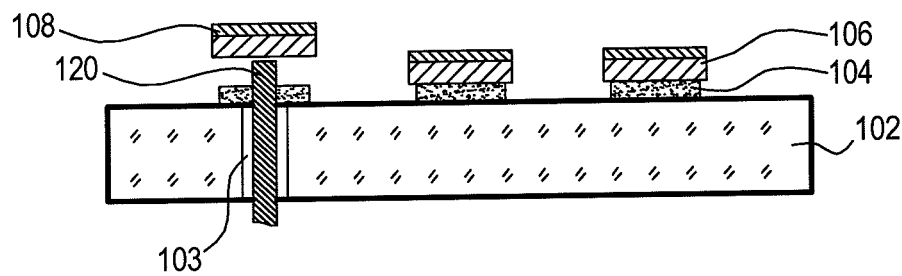

Referring to FIG. 10, in another embodiment, the cover glass 106 having the circuit unit 108 is removed from the mother plate 102 by a butting process. More detailed, the mother plate 102 includes a plurality of holes 103 which are corresponding to the cover glasses 106 respectively. A thimble 120 is inserted into the hole 103 of the mother plate 102, and then is adapted to butt the cover glass 106 from the mother plate 102 so as to separate the cover glass 106 from the mother plate 102. As described above, the adhesive material 104 cannot be stayed on a surface of the cover glass 106 during the removing process either.

Figure 11:
FIG. 11 is a cross-sectional view of a touch panel according to an embodiment of the present invention.
Figure 12:
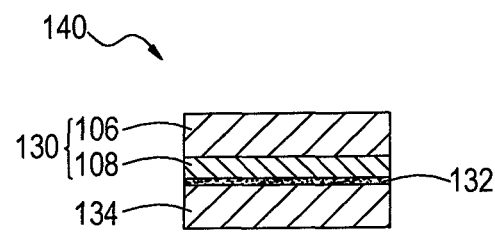
FIG. 12 is a cross-sectional view of a touch display according to an embodiment of the present invention.

Referring to FIG. 11, in this embodiment, after the cover glass 106 having the circuit unit 108 is removed from the mother plate 102, a projective capacitance type touch panel 130 is completed, wherein the projective capacitance type touch panel 130 includes one cover glass 106 and one circuit unit 108 integrated onto the cover glass 106, and has not any film for covering the circuit unit 108. Referring to FIG. 12, the projective capacitance type touch panel 130 is attached and installed to a display module 134 so as to complete a touch display 140 by an optical clear adhesive (OCA) 132.

Figure 13:
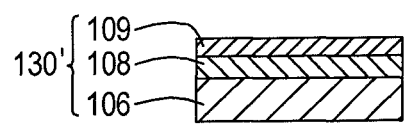
FIG. 13 is a cross-sectional view of a touch panel according to another embodiment of the present invention.
Figure 14:
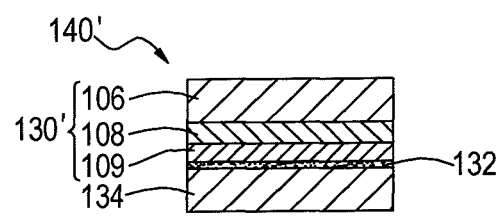
FIG. 14 is a cross-sectional view of a touch display according to another embodiment of the present invention.

Referring to FIG. 13, in another embodiment, before the cover glass 106 having the circuit unit 108 is removed from the mother plate 102, a film 109 covers the circuit unit 108a. Then, the cover glass 106 having the circuit unit 108 and the film 109 is removed from the mother plate 102 so as to complete a projective capacitance type touch panel 130', wherein the projective capacitance type touch panel 130' includes one cover glass 106 and one circuit unit 108 integrated onto the cover glass 106, and has one film for covering the circuit unit 108. Referring to FIG. 14, the projective capacitance type touch panel 130' is attached and installed to a display module 134 so as to complete a touch display 140' by an optical clear adhesive (OCA) 132.

A method for manufacturing a touch pane of the present invention carry out a plurality of sensor processes on multiple cover glasses simultaneously (the cover glass is a small piece of glass) so as to increase the efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a touch panel comprising the following steps of:
    providing a mother plate;
    forming a plurality of adhesive material on the mother plate;
    disposing a plurality of cover glasses on the adhesive material respectively;
    curing the adhesive material, whereby the cover glasses are attached to the mother plate;
    forming a plurality of circuit units on the cover glasses respectively; and
    removing the cover glass having the circuit unit from the mother plate, wherein the bonding strength of the cured adhesive material is within a range about between 5 g/25 mm and 600 g/25 mm.

2. The method as claimed in claim 1, wherein the circuit units comprises a transparent trace area, and the transparent trace area is formed by a sputtering process and a photolithography/etching process.

3. The method as claimed in claim 2, wherein the sputtering process is operated within the temperature range about between 25 and 190 degrees Celsius, and the cured adhesive material is durable within the temperature range about between 15 and 200 degrees Celsius.

4. The method as claimed in claim 2, wherein the photolithography/etching process is operated within the acidity/alkalinity range being about PH: 0-3 and PH: 11-14, and thus the cured adhesive material is durable within the acidity/alkalinity range being about PH: 0-3 and PH: 11-14.

5. The method as claimed in claim 1, wherein the adhesive material is an ultraviolet rays adhesive made of ink material.

6. The method as claimed in claim 1, wherein the adhesive materials are formed on the mother plate by a printing process, an adhesive dispensing process or a spraying process.

7. The method as claimed in claim 1, wherein a bonding area between the adhesive material and the mother plate is equal to that between the adhesive material and the cover glass, and a bonding area between the adhesive material and the cover glass is smaller than an area of the cover glass.

8. The method as claimed in claim 1, wherein the cover glass having the circuit unit is removed from the mother plate by a scraping process.

9. The method as claimed in claim 1, wherein:
    the mother plate comprises a plurality of holes which are corresponding to the cover glasses respectively; and
    the cover glass having the circuit unit is removed from the mother plate by a thimble of a butting process.

10. The method as claimed in claim 1, wherein:
    before the cover glass having the circuit unit is removed from the mother plate, a film covers the circuit unit; and
    the cover glass having the circuit unit and the film is removed from the mother plate.

* * * * *